W. H. DICKEY.
Chain.

No. 229,105. Patented June 22, 1880.

Fig. 5ª.

Witnesses:
N. N. Low.
J. S. Barker.

Inventor:
William H. Dickey
by H H Doubleday atty

UNITED STATES PATENT OFFICE.

WILLIAM H. DICKEY, OF JACKSON, MICHIGAN, ASSIGNOR OF ONE-HALF OF HIS RIGHT TO GEORGE S. BENNETT, OF SAME PLACE.

CHAIN.

SPECIFICATION forming part of Letters Patent No. 229,105, dated June 22, 1880.

Application filed February 14, 1880.

*To all whom it may concern:*

Be it known that I, WILLIAM H. DICKEY, of Jackson, in the county of Jackson and State of Michigan, have invented certain new and useful Improvements in Chains; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
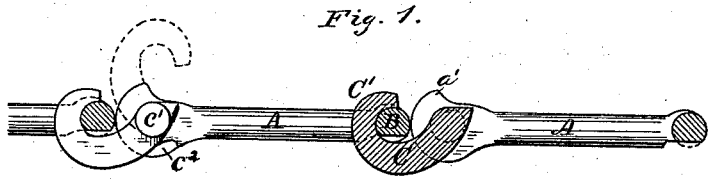
Figure 2:
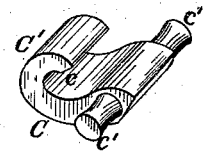
Figure 3:
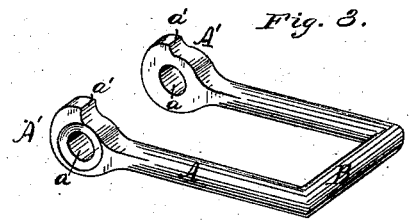
Figure 4:
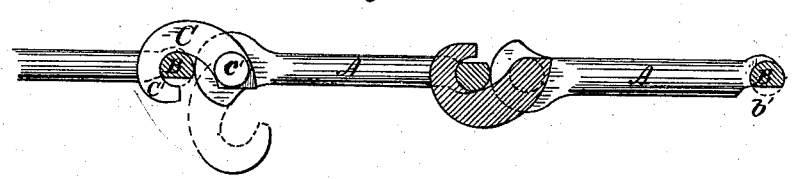
Figure 5:
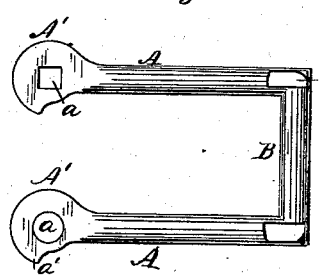
Figure 7:
Figure 6:
Figure 6:
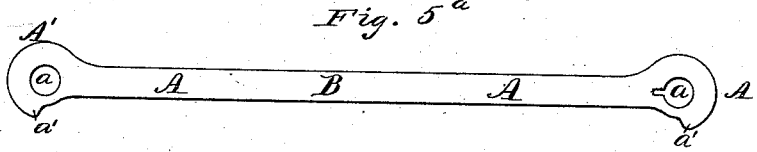

Figure 1 is a longitudinal section of my improved chain. Fig. 2 is a detached view of one form of the hook. Fig. 3 is a detached view of the U-shaped part of the link with its ears in proper position to receive the hook. Fig. 4 is a section of links, one of them being in an inverted position. Fig. 5 is a detached view of the U-shaped portion of the link as cast or punched from a plate of metal. Fig. 6 represents pins or pivots, by means of which the hook is attached to the side bars. Fig. 7 is a detached view of another form of hook.

The U-shaped portion of the link is formed of two side bars, A A, each connected at one end to an end bar, B, and provided at their opposite ends with seats or pivot-holes $a$, the side bars being enlarged, as at A' A', to receive these seats. Each of the enlarged portions A' is formed with a shoulder, $a'$.

The hook is formed of a base, C, and a curved part, C', the throat $c$ being of such size as will permit the end bar, B, to pass freely into the hook, said end bar being by preference round, its diameter in cross-section being about equal to the width of the throat. I connect the hook with the heads A' A' of the side bars by means of pivots, so that the hook shall swing freely in the U-shaped part of the link, except that, when preferred, the link may be formed with a projecting lug or stop, $c^2$, which will engage with the hook, and thus restrict the movement of the hook and side bars relative to each other, as indicated in Fig. 1.

I have shown a number of plans for connecting the hook with the side bars—for instance, in Fig. 2 the hook is represented as provided with pivots $c'$ formed thereon.

When the link is to be made of cast metal, of either malleable iron, gray iron, steel, or other metal which may be poured into molds, I propose to either cast the hook first and then form the U-shaped link by casting it about the pivots, or form the U-shaped part first and afterward cast the hook with the pivots extending through the seats $a$.

If the end bar and the side bars be cast in the form shown in Fig. 3 cores must be used for the pivot-seats $a$; but when these parts are cast of steel or malleable iron they may be made in the form represented in Fig. 5, in which case cores may be dispensed with, as the pattern can be drawn from the sand, the side bars being afterward twisted about a quarter of a turn to bring the seats into proper position to receive the pivots.

Instead of casting the hook with the pivots attached, it may be formed with an opening to receive a pivot substantially like those shown in Fig. 6. I prefer this latter method, as it possesses many advantages over the one above referred to—that is, of casting the hook and its pivots in one piece. For instance, by using a separate pivot it may be made of much stronger metal than the other parts of the link, whereby the size of the hole through the base of the hook and the seats $a$ $a$ may be reduced, while still retaining the requisite strength, and all wear in the seats may be prevented by constructing the pivot with a spline or feather, as shown at $d$, Fig. 6, or by squaring one end of the pivot or other equivalent construction, and then making one of the seats of corresponding shape, which will, of course, prevent the pivot from turning, whereby all the wear occasioned by the swinging of the hook will come upon the inside of the hole through its base.

In all of the construction I propose to countersink the seats upon their outer ends and to upset the outer ends of the pivots after placing them in their seats, so as to insure that the side bars shall not spread when under tension.

By preventing the pivot from rotating, as above explained, I am enabled to prevent the side bars from spreading with but a shallow countersink, which shallow countersink facilitates the removal of the pivot intentionally should that become desirable; or, when preferred, in casting the side bars upon the hook, or vice versa, the pivots may be formed with enlarged outer ends or heads, (see Fig. 2,) which will serve the same purpose. When the side bars and end bar are to be made of steel or wrought-iron, I may strike them or punch them from a sheet, by suitable mechanism, into the shape indicated in Fig. 5, afterward twisting the side bars to bring the seats or eyes into proper position to receive the pivots; but I prefer to make them out of a practically straight piece of metal, as in Fig. 5ª, and then bend it into the required U shape.

By an examination of the drawings it will be readily understood that when a hook is moved into the position shown in dotted lines, Fig. 1, the links can be readily detached; but at the same time they will be held together when the hook is in the position shown in full lines, same figure.

I am aware that chain-links have been formed with permanently-open hooks cast thereon, the throats of the hooks being each narrower than the shortest diameter of some portion of the engaging end bar in cross-section; that links have been heretofore made with their hooks pivoted to the side bars, and that links have been made with their end bars eccentric and recessed; hence I do not claim in this patent any of these features, but propose to be limited to the invention set forth specifically in the claim, reserving the right to claim all other patentable matter which may be shown and described herein in other applications heretofore filed by me.

What I claim is—

A chain-link constructed of a U-shaped portion having its ends enlarged, as at A′, and provided with shoulders, as at a′ a′, and having a pivoted hook, C C′, the point of the hook being in the described relation to the enlarged portion, and shoulders a′, whereby the end bar of an adjoining link is retained in the hook when the links and hooks are in a substantially straight line, but may be readily detached therefrom when the hook is moved into a position at substantially a right angle to the body of the link, substantially as set forth.

In testimony that I claim the foregoing I have hereunto set my hand this 12th day of February, 1880.

WILLIAM H. DICKEY.

Witnesses:
  GEO. S. BENNETT,
  GEORGE DANIELS.